United States Patent [19]

Arai et al.

[11] Patent Number: 4,826,424
[45] Date of Patent: May 2, 1989

[54] LENS BARREL MADE BY INJECTION MOLDING

[75] Inventors: Takashi Arai, Tokyo; Katsuo Kawano, Kawasaki, both of Japan

[73] Assignee: Canon Kabushiki Kaisha, Tokyo, Japan

[21] Appl. No.: 908,982

[22] Filed: Sep. 18, 1986

[30] Foreign Application Priority Data

| Sep. 25, 1985 | [JP] | Japan | 60-213041 |
| Oct. 9, 1985 | [JP] | Japan | 60-226565 |
| Nov. 14, 1985 | [JP] | Japan | 60-256159 |
| Nov. 27, 1985 | [JP] | Japan | 60-266780 |
| Dec. 3, 1985 | [JP] | Japan | 60-272820 |

[51] Int. Cl.$^4$ .................................... B29C 45/13
[52] U.S. Cl. ............................... 425/542; 264/328.8;
  264/DIG. 57; 350/254; 350/255; 350/505;
  354/286; 354/288; 425/586; 428/412
[58] Field of Search .............. 354/286, 288 P, 288 M;
  350/254, 255, 503–505; 428/36, 412; 425/129
  R, 132, 257, 572, 573, 808, 585–588, 562, 564,
  568, 542; 264/2.7, 250, 255, 328.8, 328.12,
  328.13, 254, DIG. 57, DIG. 83

[56] References Cited

U.S. PATENT DOCUMENTS

| 3,599,290 | 8/1971 | Garner | 264/255 |
| 3,690,797 | 9/1972 | Garner | 425/146 |
| 3,733,156 | 5/1973 | Garner | 425/562 X |
| 3,801,684 | 4/1974 | Schrewe et al. | 264/DIG. 83 |
| 3,809,519 | 5/1974 | Garner | 425/564 |
| 3,873,656 | 3/1975 | Garner | 264/328.8 X |
| 4,029,841 | 6/1977 | Schmidt | 264/328.12 X |
| 4,052,497 | 10/1977 | Monnet | 264/255 |
| 4,110,008 | 8/1978 | Vesugi et al. | 354/286 X |
| 4,152,064 | 5/1979 | Hashimoto et al. | 354/286 |
| 4,152,065 | 5/1979 | Kobori | 354/288 M |
| 4,196,997 | 4/1980 | Ohmori et al. | 354/286 |
| 4,213,686 | 7/1980 | Kellner | 354/286 X |
| 4,247,600 | 1/1981 | Adachi | 354/288 M X |

FOREIGN PATENT DOCUMENTS

| 28464 | 9/1975 | Japan | 264/328.8 |
| 52-62370 | 5/1977 | Japan | 264/328.8 |
| 107336 | 6/1984 | Japan | 354/288 M |

Primary Examiner—Richard L. Chiesa
Attorney, Agent, or Firm—Fitzpatrick, Cella, Harper & Scinto

[57] ABSTRACT

A lens barrel member in which an equally divided helicoid portion is provided on the inner periphery or the outer periphery of a cylinder member forming a lens barrel, and an engaging portion engaged with another lens barrel component is provided at the end of the outer periphery of the cylinder member coaxially with the helicoid portion, the cylinder member being of a sandwich-molded structure comprising a core layer and a skin layer. Also disclosed is a method of molding such lens barrel member.

7 Claims, 12 Drawing Sheets

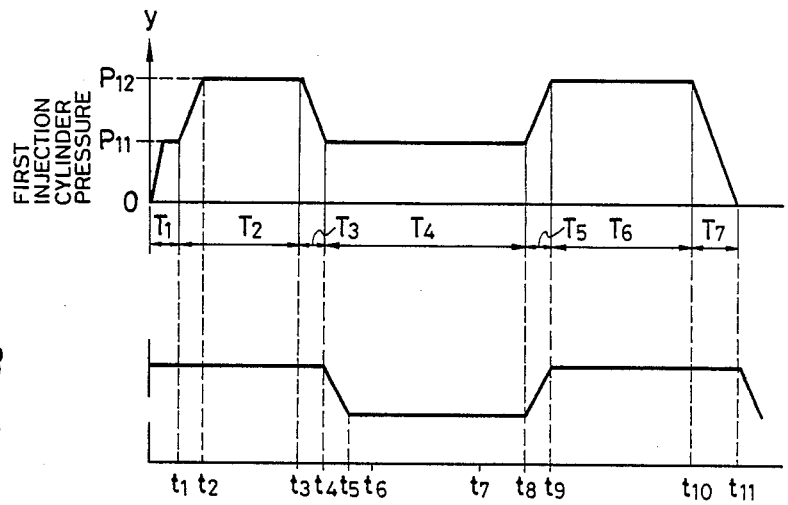
FIG. 23A
FIG. 23B
FIG. 23C
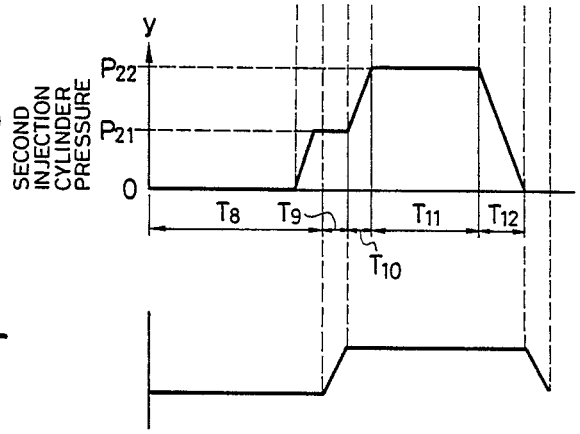
FIG. 23D
FIG. 23E

LENS BARREL MADE BY INJECTION MOLDING

BACKGROUND OF THE INVENTION

1. Field of the Invention

This invention relates to injection molding, and more particularly to the technique of injection molding for forming the central portion of a molded article of a core layer resin material and forming the surface portion thereof of a skin layer resin material and molding the article in the shape of sandwich in which the core layer resin material of the central portion is surrounded by the skin layer resin material.

2. Related Background Art

Lens barrels comprise a lens, a lens holding frame, a fixed cylinder, an intermediate cylinder, an operating ring, etc. and in which the lens holding frame is moved and controlled in a direction parallel to the optic axis by rotation of the operating ring about the optic axis through the intermediate cylinder. The intermediate cylinder can comprise a helicoid cylinder provided with helicoid portions on the inner and outer peripheries thereof to convert the rotational force of the operating ring about the optic axis into movement of the lens holding frame in a direction parallel to the optic axis. Adoption of a metal material such as aluminum (Al), brass (Bs) or the like as the material of the barrel has a physical advantage, but it poses numerous problems such as heaviness, the increased cost resulting from the machining of metal and the limit of improvement of productivity. Thus, injection molding using resin materials instead of metal materials for the lens barrel is practised. As suitable resin materials for the helicoid cylinder, there are known polycarbonate, ABS, polybutylene terephthalate (PBT), denatured polyphenylene oxide, etc., and further, resin materials having glass fiber or carbon fiber mixed therewith to reinforce the mechanical strength have been used.

The aforementioned polycarbonate having glass fiber mixed therewith can provide a helicoid cylinder of low cost, high accuracy, and mechanical strength, but still suffers from the problem that the glass fiber becomes exposed on the inner and outer peripheral surfaces of the helicoid cylinder; thus, improvement is required in the slidability of the helicoid cylinder when threadably engaged and sliding with inner and outer mating cylinders.

As a solution to the above-noted problem the cylinder member can be made into a layered structure. For example, by the use of the sandwich molding (hereinafter referred to as SW molding) as described in Japanese Patent Publication No. 28464/1975 (U.S. Pat. Nos. 3,809,519; 3,599,290; and 3,733,156), a resin material, having no glass fiber mixed therewith and excellent slidability and forming the surface layer of a helicoid cylinder, is first poured into the cavity of a metal mold for molding the helicoid cylinder, and then a resin material having glass fiber mixed therewith forming the core of the helicoid cylinder is poured into the cavity, whereby the surface layer is formed of smooth resin and the core is formed of resin of great mechanical strength, thereby obtaining a helicoid cylinder which can solve the above-noted problem.

SUMMARY OF THE INVENTION

It is a first object of the present invention to provide a lens barrel which is injection-molded with resin materials and in which various portions of the lens barrel such as a helicoid portion, an accessory mounting portion and a key way portion are made by sandwich molding to improve the functions of those portions.

It is a second object of the present invention to use no sandwich molding for a portion of the lens barrel, for example, the accessory mounting portion, but to fill such portion with only a core layer resin material to thereby enhance the strength of the mounting portion and construct the lens barrel by a molding portion using sandwich molding and a molding portion using no sandwich molding, thereby improving the function of the lens barrel.

It is a third object of the present invention to provide a lens barrel which has a plurality of functional portions such as a helicoid portion and a projected portion for a key way and in which the helicoid portion and the projected portion can be sandwich-molded accurately (so as to become a uniform sandwich).

A further object of the present invention lies in the following point.

The injection molding machine shown in the above-mentioned patent publication and the injection molding machine proposed by the applicant are of a construction in which first and second resin materials for forming the core and the surface layer, respectively, are poured into the same molding cavity of a mold through a value communicating with the cavity and therefore, it is difficult to adjust the injection pressures of the resins. For example, the resin pressures from first and second injection cylinders act on the valve for changing over the pouring-in of the resins and therefore, the rotational movement of the valve is affected by the resin pressures applied to the valve.

To increase the frequency of injection within a unit time and enhance the productivity, it is desirable to start the injection cylinder pressure from a low level and then enhance it to the injection pressure during each injection step, and maintain the resin pressure at a high level for the next injection after the termination of the previous injection, and it is preferable to drop the injection pressure to a low level to smoothly effect rotation of the valve, but it is insufficient to carry out the step of reducing the injection pressure below a level which ensures smooth rotation of the valve. Also, if the operation of the valve is effected under high pressure to enhance the productivity, the life of the valve will become very short and also, there will arise a problem that the resin leaks from around the valve.

Still a further object of the present invention is to provide a molding method which can solve the above-noted problems.

BRIEF DESCRIPTION OF THE DRAWINGS

Figure 6:
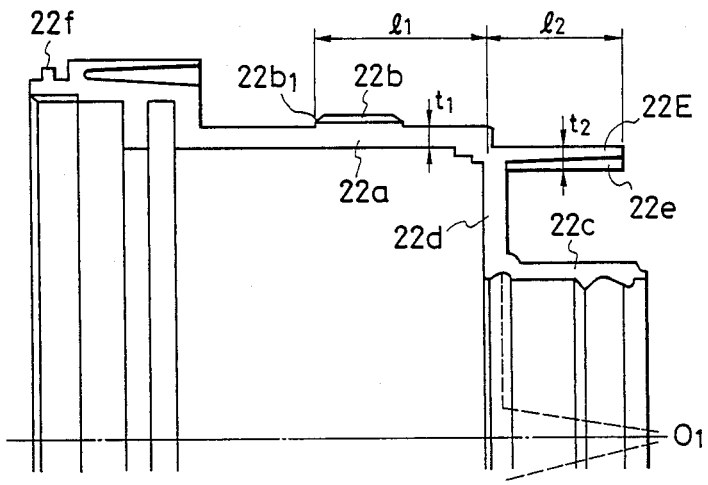
Figure 7:
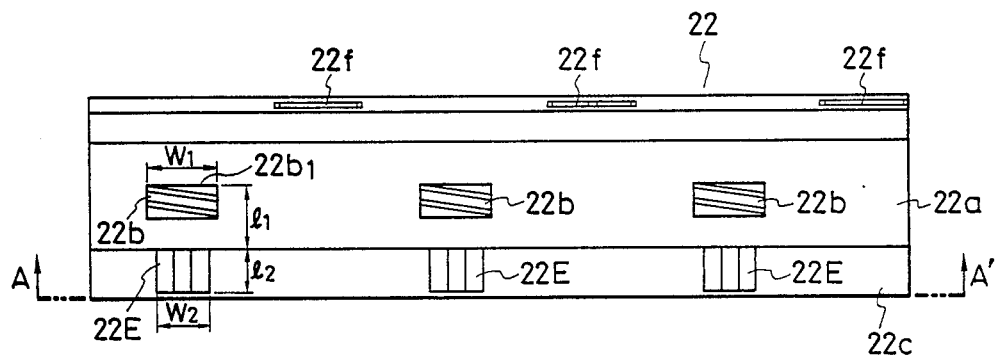
Figure 8:
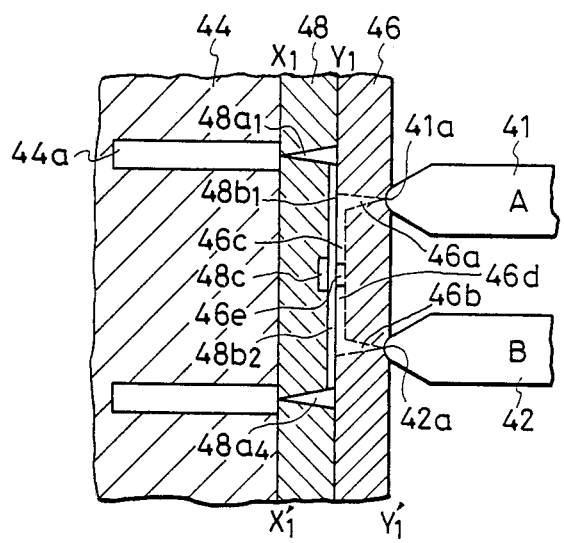
Figure 9A:
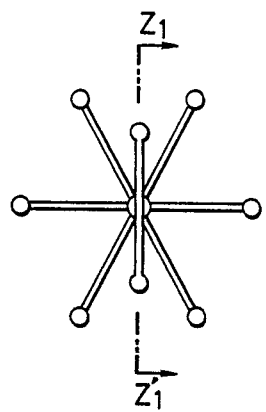
Figure 9B:
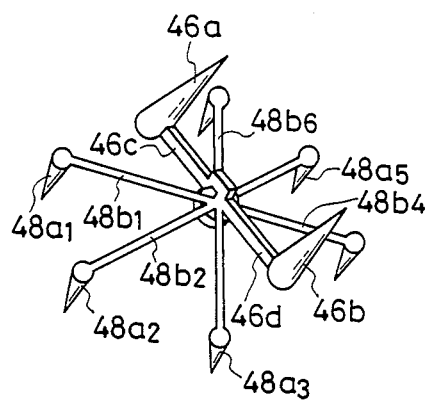
Figure 9C:
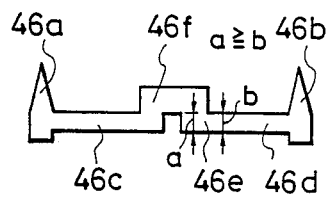
Figure 10A:
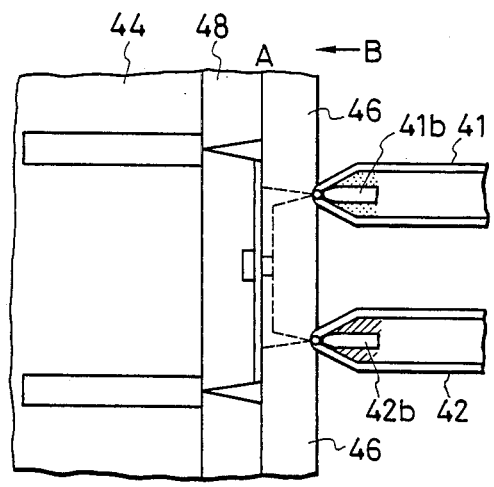
Figure 10B:
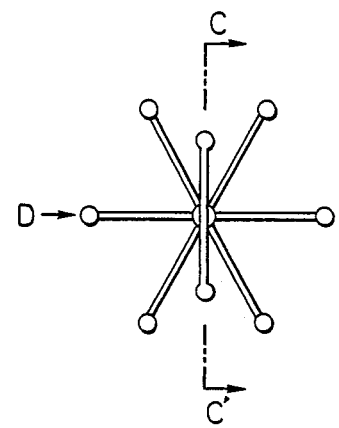
Figure 11A:
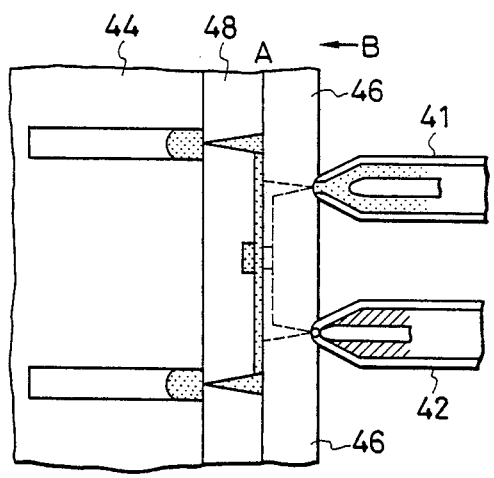
Figure 11B:
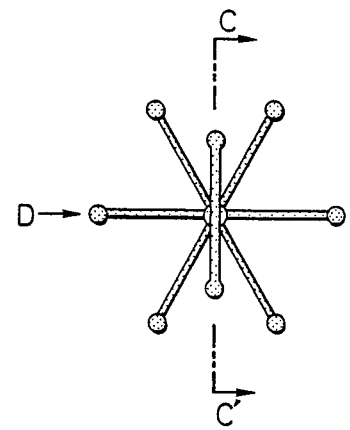
Figure 12A:
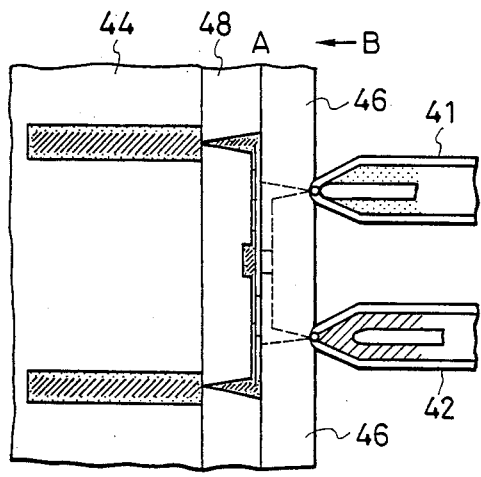
Figure 12B:
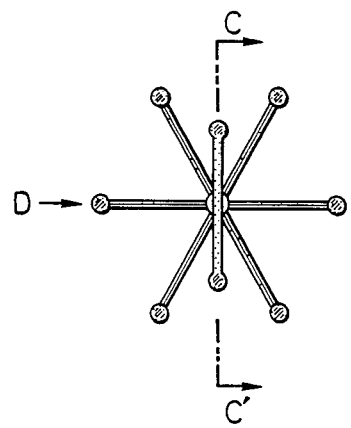
Figure 13A:
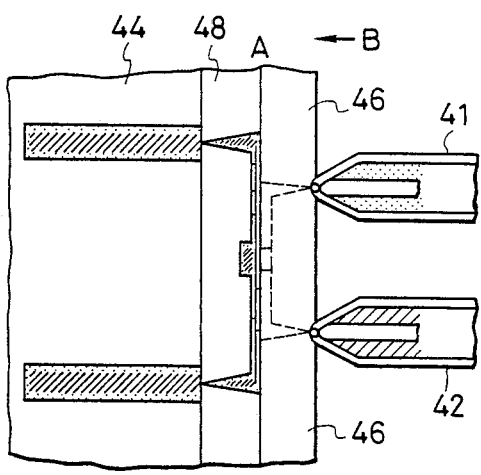
Figure 13B:
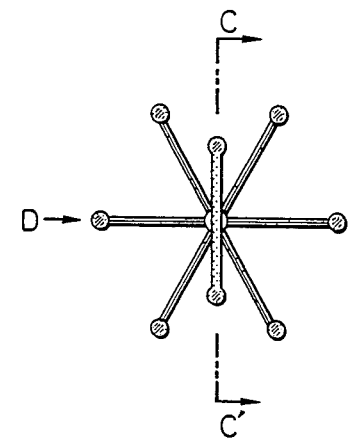
Figure 14:
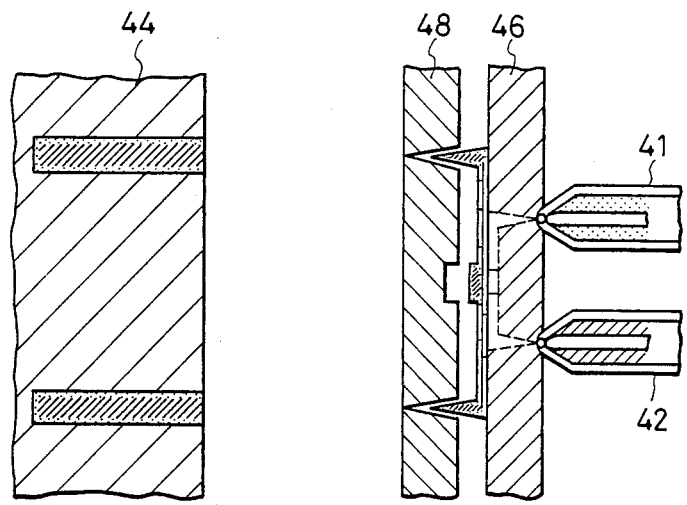
Figure 15:
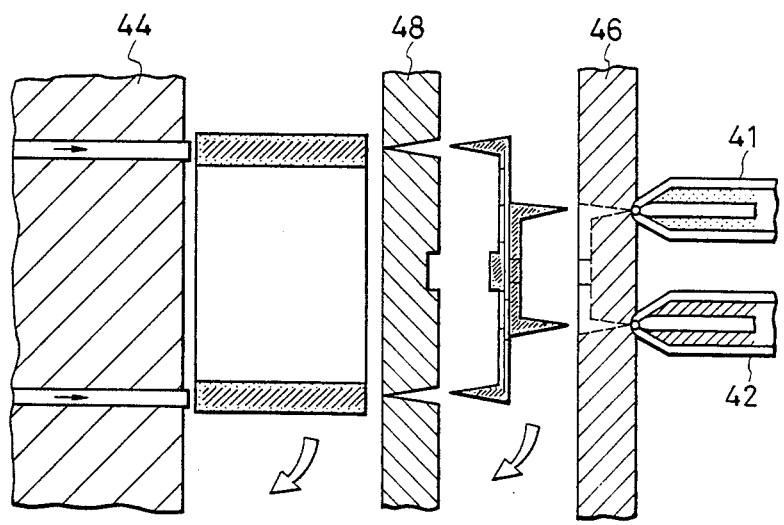
Figure 16:
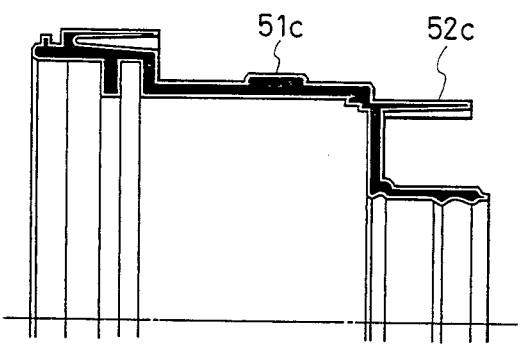

FIGS. 6 to 16 illustrates an embodiment for uniformly forming a skin layer on the helicoid portion and key engaging portion of a third embodiment, FIG. 6 being a partial cross-sectional view of a lens barrel member according to the present embodiment, FIG. 7 being a top view of the lens barrel member shown in FIG. 6, FIG. 8 being a cross-sectional view of the molding of the lens barrel member, FIG. 9A being a plan view of the sprues and runners, FIG. 9B being a perspective view of the sprues and runners, FIG. 9C being a cross-sectional view of the sprue and runner portion of the fixed plate, FIGS. 10–16 showing the operation of the present invention with FIGS. 10A and 10B showing the state in which the resin is not yet injected into the fixed plate, FIGS. 11A and 11B showing the skin layer resin pouring step in which the needle valve 41b in first cylinder unit 41 is opened so that equal amounts of resin A are uniformly injected into conical vertical runners $48a_1$–$48a_6$ of runner plate 48, FIGS. 12A and 12B showing the core layer resin pouring step in which needle valve 42b in second cylinder 42 is opened to inject resin B into sprue 46b and runners $48_1b$–$48b_6$, FIGS. 13A and 13B showing the closing of needle valve 42b so that the resin can be cooled, FIG. 14 showing the step of removing the molded article, FIG. 14 showing the separating of the joined surface $Y_1$–$Y_1$ and the removal of a core layer resin B from the runners and sprues, and FIG. 16 being a cross-sectional view of the lens barrel member of FIG. 6 when sandwich-molded.

Figure 17:
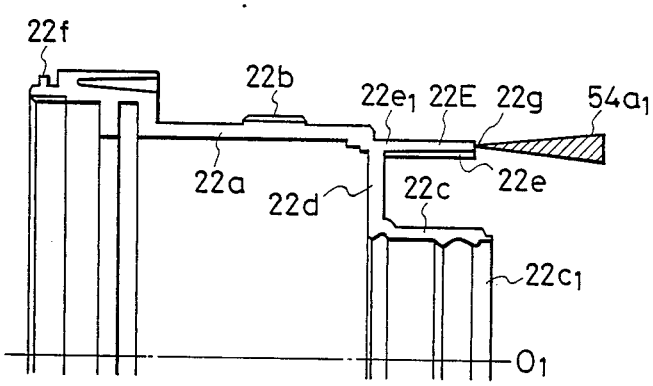
Figure 18:
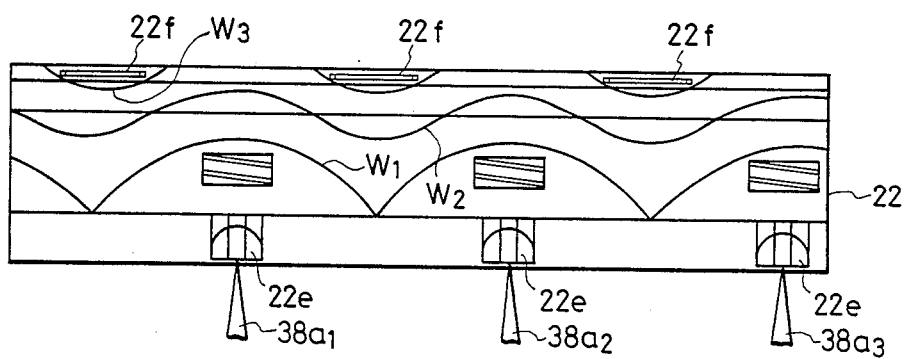

FIGS. 17 and 18 show an embodiment in which a resin pouring-in gate position is provided in a key way engaging portion, FIG. 17 being a cross-sectional view of the essential portions of the lens barrel member, and FIG. 18 being a plan view of the lens barrel member illustrating a state in which resin is being poured in.

Figure 19:
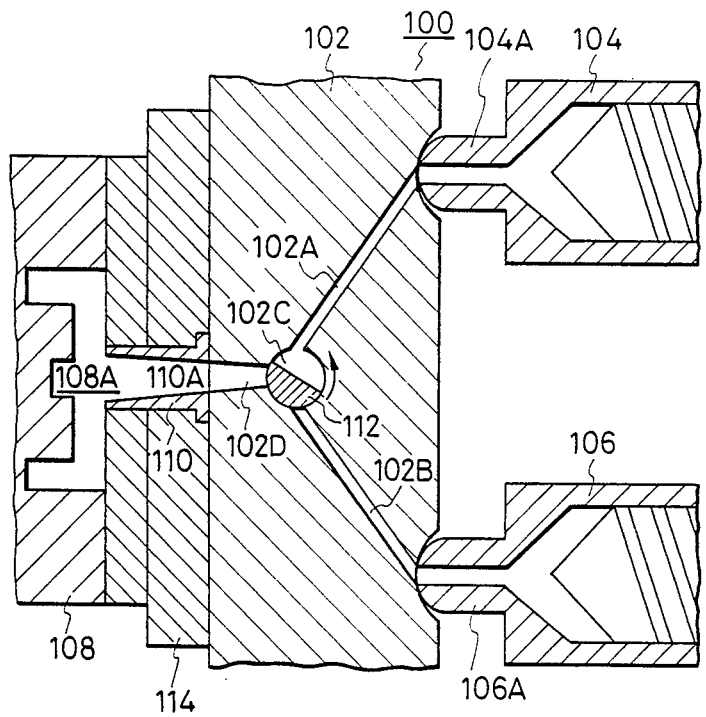
Figure 20:
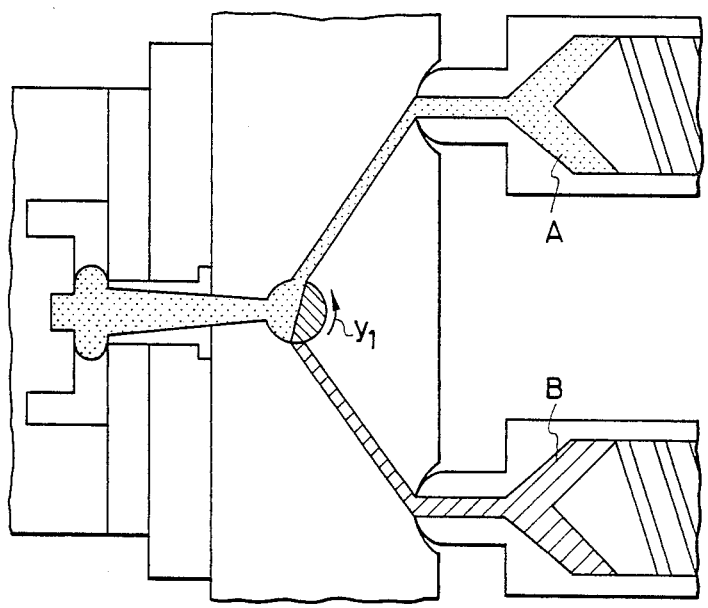

FIGS. 19 to 23(a) through 23(e) illustrate the various steps of the process of using an injection molding machine, FIG. 19 being a cross-sectional view of the molding machine showing the state before resin is poured into a metal mold 2, FIG. 20 being a partial cross-sectional view of the injection molding machine showing a state in which resin for forming a skin layer is poured in.

Figure 21:
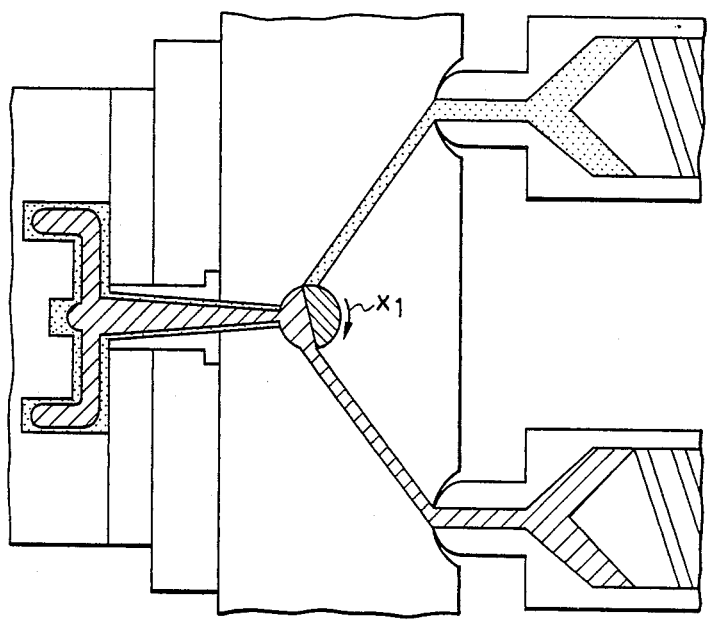
Figure 22:
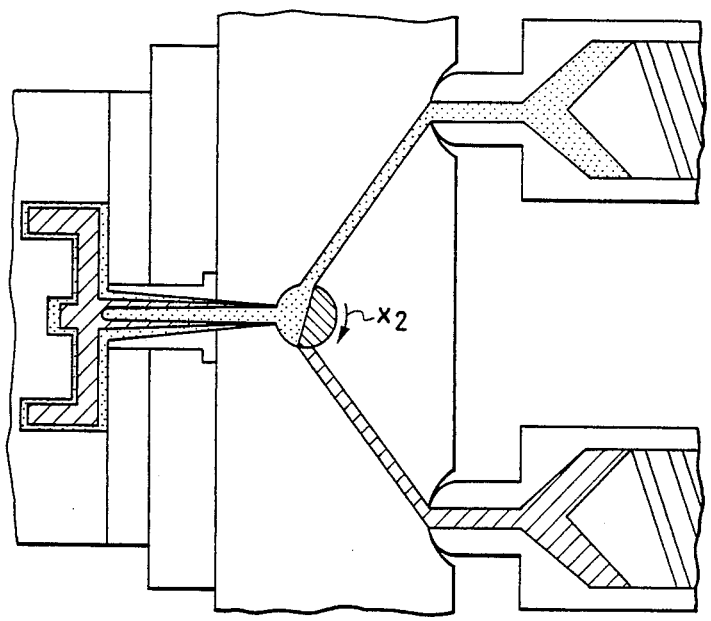

FIG. 21 is a partial cross-sectional view of the injection molding machine showing a state in which resin for forming a core layer is poured in, FIG. 22 and FIG. 22 is a partial cross-sectional view of the injection molding machine. showing in state in which the passageway in a valve is filled with a skin layer.

FIGS. 23(a), (b), (c), (d) and (e) are pressure graphs.

DESCRIPTION OF THE PREFERRED EMBODIMENTS

Figure 1:
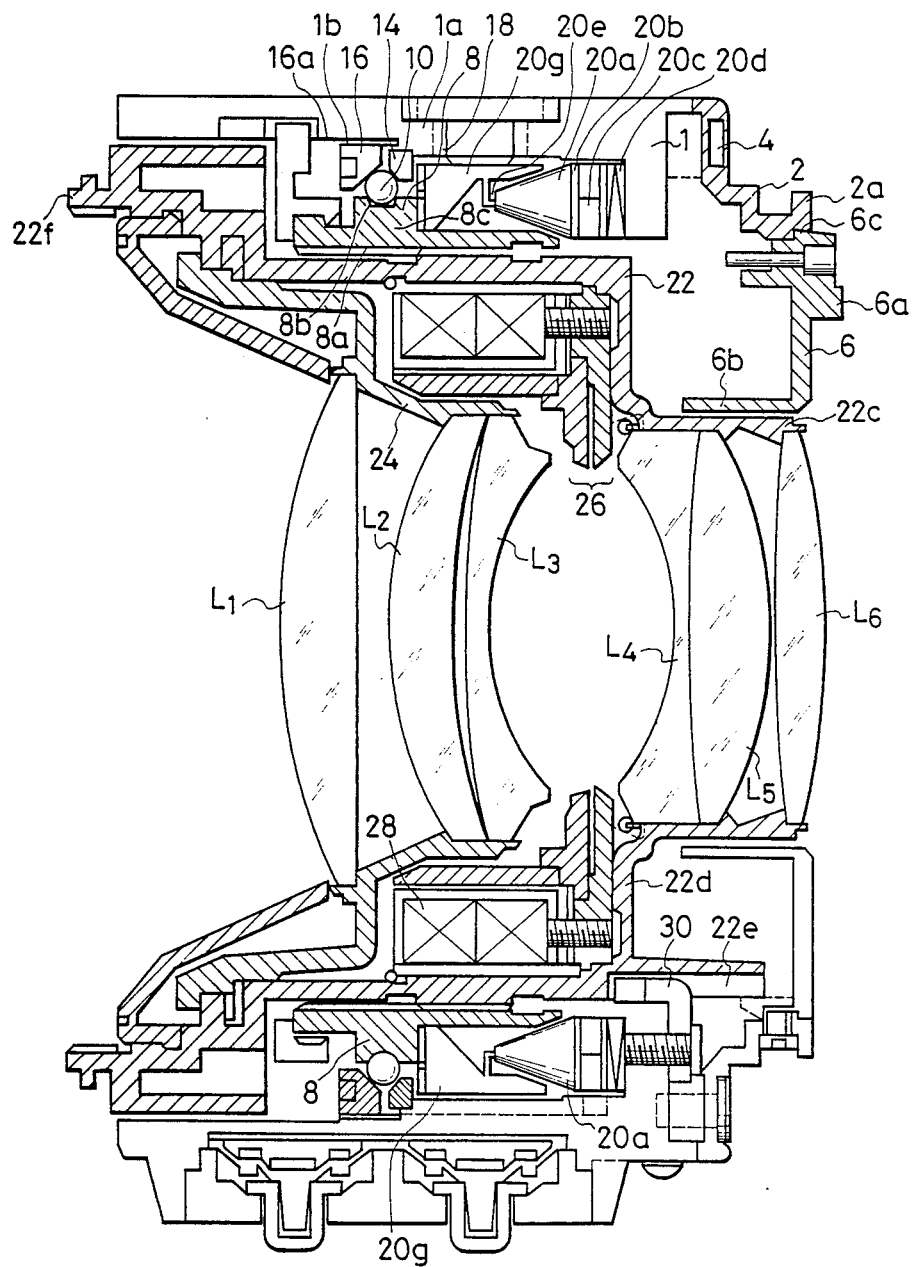
FIG. 1 is a cross-sectional view of a lens barrel using a helicoid cylinder according to the present invention.

FIG. 1 shows a cross-sectional view of an example of the lens barrel using a helicoid cylinder according to the present invention. In FIG. 1, reference numeral 1 designates a fixed cylinder having a bayonet ring 2 fixed to the rear end thereof by means of a screw 4.

Denoted by 2a is the bayonet pawl of the bayonet ring 2. Reference numeral 6 designates a mount lid member having a cylinder portion 6b extending from the inner diameter of a disk portion 6a and molded integrally therewith by resin molding.

The mount lid member 6 has a plurality of engaging pawls 6c protruding rearwardly from the outer periphery of the disk portion 6a and molded integrally with one another, and is fixed with these engaging pawls 6c being fitted into engaging grooves or holes provided in the bayonet ring 2, by the utilization of the elasticity of resin.

Reference numeral 8 denotes a moving ring provided with a helicoid 8a on the inner peripheral surface thereof, and a ring-like protrusion 8c, formed with a ball race 8b in which a bearing ball 10 moves, is provided on the outer periphery of the moving ring.

Reference numerals 14 and 16 designate ball holding rings which hold ball 10 and cooperate with the ring-like protrusion 8c of the moving ring 8 to form a bearing portion. The ball holding ring 14 has in the outer periphery thereof an engaging groove or hole engaged with a projection 1a formed on the inner periphery of the fixed cylinder 1, and the inner peripheral surface thereof is formed with an inclined surface for holding the ball 10.

The ball holding ring 16 has on the outer periphery thereof a threaded portion 16a threadably engaged with a threaded portion 1b formed on the inner periphery of the fixed cylinder 1, and an inclined surface for holding the ball 10. Dot-and-dashed line 18 indicates the position at which a device for detecting the amount of movement is disposed. An ultrasonic motor 20 for rotatably driving the moving ring 8 is disposed between the moving ring 8 and the fixed cylinder 1.

The ultrasonic motor 20 comprises a rotor portion and a stator portion. The stator portion comprises a vibrating member 20a, a piezo-electric element 20b secured to the vibrating member 20a, a holding member 20c and a spring member 20d, and the rotor portion comprises a friction member 20e, and a connecting member 20g for connecting the motor to the moving ring 8.

Figure 2:
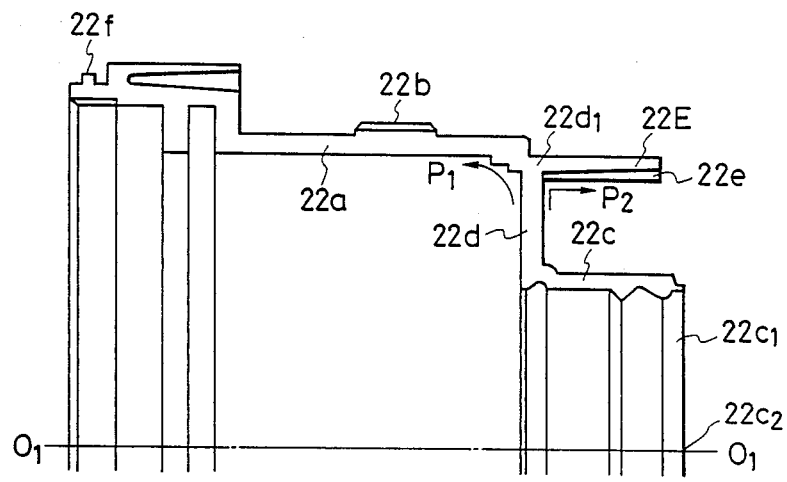
FIG. 2 is a cross-sectional view of the upper portion of the helicoid cylinder as a molded article.

Reference numeral 22 designates a helicoid cylinder according to the present invention. The helicoid cylinder 22, as shown in FIG. 2, has a cylinder portion 22a, a helicoid portion 22b threadably engaged with the helicoid 8a of the moving ring 8, a lens holding frame portion 22c for holding a lens L, a wall portion 22d connecting the cylinder portion 22a to the lens holding frame portion 22c, a projected portion 22E provided with a key way 22e provided in the cylinder portion 22a extending toward the camera body, and a mounting portion 22f which is a cylinder portion extending from the cylinder portion 22a toward an object to be photographed and which protrudes in the radial direction relative to the optic axis $O_1$ and on which an accessory such as a filter is mounted.

Reference numeral 24 denotes a lens holding ring for holding lens groups L1–L3. The lens holding ring 24 is fixed to the helicoid cylinder 22. Reference numeral 26 designates a diaphragm unit, and reference numeral 28 denotes a motor for driving the diaphragm unit. The diaphragm unit 26 and the motor 28 are fixed to the helicoid cylinder 22, but the construction and action thereof need not be described herein because they have no direct relation with the present invention.

The operation of the lens barrel having the construction as shown in FIG. 1 will now be described. When the lens barrel shown in FIG. 1 is mounted on a camera, an auto-focusing device on the camera side is operated and the ultrasonic motor 20 is driven. By the rotation of the rotor portion 20g of the motor 20, the rotatable ring 8 connected to the rotor portion 20g is rotated about the optic axis. The rotatable ring 8 is threadably engaged with the helicoid cylinder 22 and a key member 30 fixed to the fixed cylinder 1 is engaged with the key way 22e of the helicoid cylinder 22 and therefore, the helicoid cylinder 22 holding lenses L1–L6 is moved in a direction parallel to the optic axis by the rotation of the rotor 20g, whereby focusing control is effected.

The helicoid cylinder 22 is structurally complicated, that is, it has the helicoid portion 22b provided on the outer periphery of the cylinder portion 22a and has the mounting portion 22f and the key way 22e provided on the front and rear portions of the helicoid portion 22b, respectively, and is connected to the lens holding frame portion 22c through the wall portion 22d, and dimensional accuracy is required of the respective portions thereof. Also, the cylinder portion 22a of the helicoid cylinder 22 is required to keep its degree of circularity and have physical strength in order to contain the diaphragm driving motor 28 therein. Strength rather than slidability is required of the accessory mounting portion 22f because a mechanical force is applied thereto during the coupling and separation thereof with respect to the accessory.

Lubricity is required of the surface layer of the helicoid portion 22b for smooth rotation of the rotatable ring 8 and strength is required of the core layer of the helicoid portion 22b.

The key way 22e is in engagement with the key member 30 and is threadably engaged with the rotatable ring 8 and therefore is subjected to the rotational action by the rotation of the rotatable ring 8 and is also subjected to the rotation suppression by the key member 30 and to the sliding action of the key member 30 and key way 22e and therefore, mechanical strength and the capability of sliding contact are required of the key way 22e.

Further, as shown in FIG. 1, the helicoid cylinder 22 effects its threadable engagement and rotation with the rotatable ring 8 and also, the fore end of the helicoid cylinder 22 partly protrudes forwardly relative to the entire lens barrel so that the protruding portion functions as the accessory mounting portion 22f.

Where a portion of the helicoid cylinder 22 is thus present as the accessory mounting portion 22f, when the work of mounting and dismounting the accessory with respect to the accessory mounting portion 22f is repeated, an unreasonable extraneous force will be applied to the mounting portion 22f and also, a biased extraneous force will act on the helicoid cylinder 22 during the mounting and dismounting of the accessory to thereby damage the mounting portion or damage the degree of circularity of the helicoid cylinder and thus adversely affect the fitness and slidability between the lens barrel components with a result that lens accuracy is reduced.

EMBODIMENT 1

To solve the above-noted problems, the central layer of the helicoid cylinder is composed of a core layer of a resin material having a great physical strength, and the outer surface of the helicoid cylinder which is outside the core layer is made into a skin layer of a resin material excellent in slidability, and the helicoid cylinder is molded into a sandwich structure in which the core layer resin material is sandwiched between the skin layer resin materials and further, the accessory mounting portion of the helicoid cylinder is made of the core layer resin material, whereby the influence of the force exerted on the accessory mounting portion is eliminated.

Figure 3:
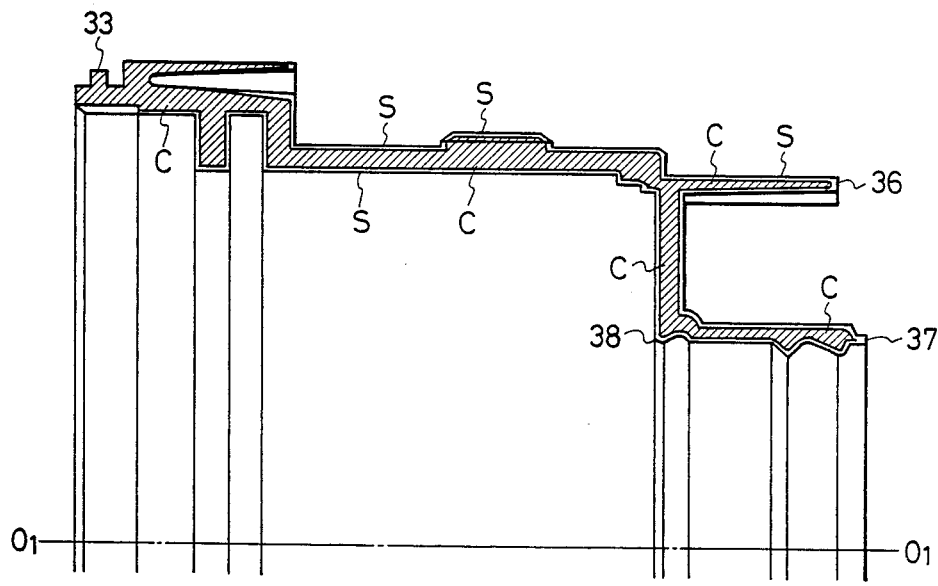
FIG. 3 is a cross-sectional view showing the layered construction of the SW-molded helicoid cylinder.
Figure 4:
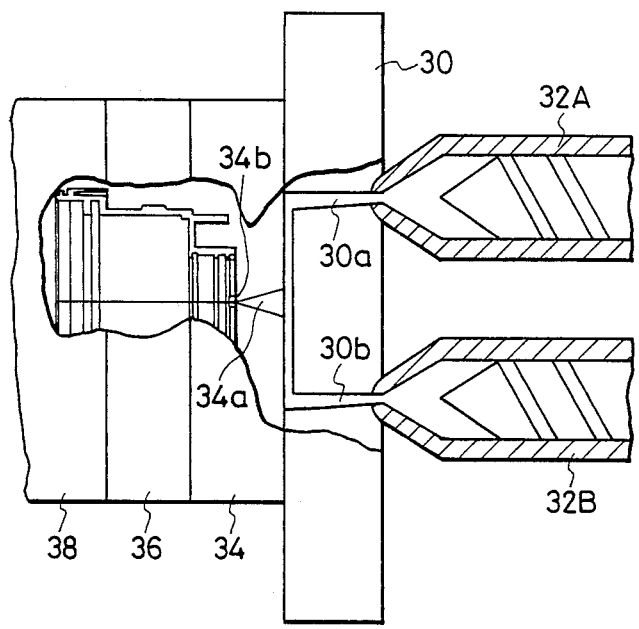
FIG. 4 is a cross-sectional view showing the essential portions of a molding apparatus for molding the helicoid cylinder according to the present invention.

FIGS. 2 to 4 show an example of the helicoid cylinder according to the present embodiment.

FIG. 3 shows a cross-sectional view of the helicoid cylinder 22 formed by pouring into the cavity in the metal mold of FIG. 4 a skin material S (White portion) forming the surface layer and core material C (indicated by hatching) formed so as to be wrapped up in the skin material.

In these Figures, the helicoid portion 22a of the helicoid cylinder 22 is disposed with the helicoids thereof being substantially equidistantly divided on the outer periphery thereof.

The accessory mounting portion 22f is formed with a bayonet-like flange portion provided on the outer periphery of the fore end of the cylinder portion.

At the rear end of the cylinder portion 22a, projected portions 22E are provided equidistantly about the optic axis in a direction parallel to the optic axis, and the key way 22e is formed in each of the projected portions 22E. The accessory mounting portion 22f and the key ways 22e are positioned on the same axis in a direction parallel to the optic axis.

In the molding apparatus of FIG. 4, reference numeral 30 designates a fixed plate having sprues 30a and 30b connecting a first injection cylinder 32A for injecting the skin layer resin material therethrough to a second injection cylinder 32B for injecting the core layer resin material therethrough. Reference numeral 34 denotes a runner plate having a runner 34a, and reference numerals 36 and 38 designate metal molds provided with a molding cavity.

It is to be understood that a gate 34b for pouring molten resin from the runner plate 34 into the molding cavity is a disk gate provided at the center 22c$_2$ of a surface 22c$_1$ closing the fore end of the lens holding frame portion 22c of the molded article of FIG. 2.

The operation and molding action of the apparatus shown in FIG. 4 will now be described.

First, a predetermined amount of skin material S is poured into the cavity from the first injection cylinder 32A via the sprues, the runner and the gate. The skin material S used is polycarbonate resin. After the predetermined amount of skin material S has been poured into the cavity, the core material C is poured from the second injection cylinder through a gate A. By the core material C being thus poured, the skin material S previously poured into the cavity is urged against the peripheral wall of the cavity by the core material C and is also pushed out from the lens holding frame portion 22c to the wall portion 22d. The skin material S which has come to the upper end of the wall portion 22d branches off to the cylinder portion 22a and the projected portion 22E and is pushed out forwardly through the cavities while being urged against the peripheral walls of the respective cavities.

The skin material S in the cavity is divided substantially equally from a branch-off point 22d$_1$, toward the cylinder portion 22a and toward the projected portion 22E and therefore, the flow line of resin is divided in a direction P1 and a direction P2 and thus becomes like a wave. The core material C is continuously poured into the cavity. The state of the skin material S filling the cavity is such that the peripheral wall of the fore end of the cylinder of the accessory mounting portion is filled with the skin material, while the bayonet flange of the mounting portion is not filled with the skin material S but is filled with the core material C.

The cylinder portion 22a of the helicoid cylinder 22 becomes SW molding in which the surface is formed of the skin material and the inside is formed of the core material.

EFFECT OF EMBODIMENT 1

As described above, in the present embodiment, where the helicoid cylinder 22, provided with the helicoid portion 22a threadably engaged with the lens barrel component (the rotatable ring 8) and the projected portion 22E provided at one end with the accessory mounting portion 22f for coupling the accessory and provided at the other end with the key way 22e for rectilinearly controlling the helicoid cylinder, is to be made by SW molding in which the skin material S and the core material C are layered and molded, the accessory mounting portion 22f and the projected portion 22E are disposed on the same axis relative to the direction parallel to the optic axis. Thus, when the skin material S goes through the cavity in the metal mold, it fills the inner peripheral wall of the projected portion 22E forming the key way 22e, but does not reach the inner peripheral wall forming the accessory mounting portion 22f and thus, the inner peripheral wall forming the mounting portion 22f is filled with the core material C. Therefore, in the helicoid cylinder according to the present invention, the mechanical strength of the accessory mounting portion 22f is sufficiently ensured, and the helicoid portion 22a and the key way 22e are of a layered sandwich structure in which the outer surface consists of the skin material S and the inside consists of the core material C, and thus, both requirements of strength and lubricity can be satisfied.

EMBODIMENT 2

An example of the lens barrel having a helicoid portion, an accessory mounting portion and a key way portion will now be described with reference to FIGS. 2, 3, 4 and 5.

In the present embodiment, a helicoid cylinder 22, having a helicoid portion 22a threadably engaged with the lens barrel component (the rotatable ring) and being of a shape having projected portions 22E provided with accessory mounting portions 22f and key ways 22e at the front and rear of the helicoid cylinder is SW-molded. In addition, the accessory mounting portions 22f are filled with only a core layer resin material in conformity with the required function of each of the aforementioned various portions, to thereby obtain a helicoid cylinder of SW molding in which the surface of the helicoid portion is a surface layer of lubricity and the central side is a core layer of great mechanical strength and in which the key way 22e may be of lubricity and mechanical strength. In order to achieve these goals, the accessory mounting portions 22f and the projected portions 22E are disposed on the same axis parallel to the optic axis.

Figure 5:
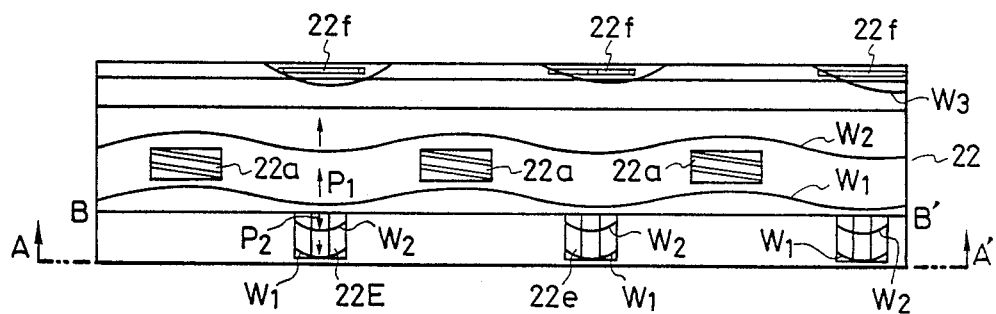
FIG. 5 is a developed view of the helicoid cylinder illustrating the flow of resin.

In FIG. 5, the helicoid portion 22a of the helicoid cylinder 22 is such that helicoids are divisionally and substantially equidistantly arranged on the outer periphery of the helicoid portion.

The accessory mounting portions 22f each are formed with a bayonet-like flange on the outer periphery of the fore end of the cylinder portion.

At the rear end of the cylinder portion 22a, the projected portions 33E are equidistantly provided about the optic axis in a direction parallel to the optic axis, and the key ways 22e are formed in the projected portions 22E. The accessory mounting portions 22f and the key ways 22e are located on the same axis in a direction parallel to the optic axis.

It is to be understood that a gate 34b through which molten resin is poured from a runner plate 34 into the molding cavity is a disk gate provided at the center $22c_2$ of a surface 22c, closing the fore end of the lens holding frame portion 22c of the molded article of FIG. 2.

The operation and molding action will now be described.

First, a predetermined amount of skin material S is poured from a first injection cylinder 32A into the cavity via a sprue, a runner and the gate. The skin material S used is polycarbonate resin. After the predetermined amount of skin material S has been poured into the cavity, a core material C is poured from a second injection cylinder into the cavity through a gate A. By the core material C being thus poured into the cavity, the skin material S previously poured into the cavity is urged against the peripheral wall of the cavity and is forced out of the lens holding frame portion 22c into a wall portion 22d. The skin material S which has come to the upper end 22d, of the wall portion 22d branches off to the cylinder portion 22a and the projected portions 22E and moves forwardly through the cavities while being urged against the peripheral walls of the respective cavities.

Wave-like lines $W_1$, $W_2$, ... shown in FIG. 5 indicate the flow lines of the leading end of the resin. The skin material S in the cavities branches off substantially equally from a branch-off point $22d_1$ toward the cylinder portion 22a and toward the projected portions 22E and therefore, the flow line of the resin is divided in the direction $P_1$ and the direction $P_2$ as shown in FIG. 2 and thus, becomes like a wave. When the core material C is continuously poured into the cavity, the flow line progresses as indicated by $W_1$, $W_2$, ..., and the flow line of the skin material S at a certain point of time becomes such as indicated by $W_3$. In this case, the state of the skin material S filling the cavity is such that the peripheral wall of the fore end of the cylinder portion of the accessory mounting portion is filled with the skin material wall of the fore end of the cylinder portion of the accessory mounting portion is filled with the skin material, while the bayonet flange portion of the mounting portion is not filled with the skin material S but is filled with the core material C.

The helicoid portion 22a of the helicoid cylinder 22 thus becomes SW molding so that its surface consists of the skin material and the inside consists of the core material.

EFFECT OF EMBODIMENT 2

As described above, in the present embodiment, where the helicoid cylinder 22, provided with the helicoid portion 22a threadably engaged with the lens barrel component (the rotatable ring 8) and the projected portion 22E provided on the outer periphery of one end with the accessory mounting portion 22f for coupling the accessory and provided at the other end with the key way 22 for rectilinearly controlling the helicoid cylinder, is to be made by SW molding in which the skin material S and the core material C are layered and molded, the accessory mounting portion 22f and the projected portion 22d are disposed on the same axis relative to the direction parallel to the optic axis. As a result, when the skin material S goes through the cavity in the metal mold, it fills the inner peripheral wall of the projected portion 22h forming the key way 22e, but does not reach the inner peripheral wall forming the accessory mounting portion 22f and thus, the inner peripheral wall forming the mounting portion 22f is filled with the core material C. Therefore, in the helicoid cylinder according to the present invention, the mechanical strength of the accessory mounting portion 22f is sufficiently ensured, and the helicoid portion 22a and the key way 22e are of a layered sandwich structure in which the outer surface consists of the skin material S and the inside consists of the core material C; and thus, both requirements of strength and lubricity can be satisfied.

EMBODIMENT 3

Reference is now made to FIG. 6 to 16 to describe an embodiment in which skin layers are uniformly formed on the helicoid portion and the key engaging portion.

In FIGS. 6 and 7, the lens barrel member 22 is provided with engaging portions 22E and accessory mounting portions 22f operatively associated with or connected to other barrel members such as the helicoid portions 22b, the lens holding portion 22c, the wall portion 22d and the key way 22e.

FIG. 8 is a cross-sectional view showing the essential portions of a molding apparatus for molding the lens barrel member 22 according to the present embodiment. Reference numerals 41 and 42 designate first and second injection cylinder units, respectively. A resin material A for forming a skin layer is injected from the injection port of the first injection cylinder unit, and a resin material B for forming a core layer is injected from the injection port of the second injection cylinder unit.

Reference numeral 44 denotes a mold member provided with a cavity 44a for a molded article which is the hollow cylindrical body of the helicoid barrel 22. The cavity 44a of the mold member 44 is one into which resin is poured to form a molded article, and the actual shape thereof forms the barrel member 22.

Reference numeral 46 designates a fixed plate which is provided with sprues 46a and 46b connected to the injection ports 41a and 42a, respectively, of the first and second injection cylinder units.

Reference numeral 48 denotes a runner plate located between the mold member 44 and the fixed plate 46. Line $X_1-X_1$ indicates the joined surface of the mold member and the runner plate 46, and this joined surface $X_1-X_1$ is provided in a direction perpendicular to the axis of the cylinder of the hollow cylindrical molding body of the mold member 44.

$Y_1-Y_1$ indicates the joined surface of the runner plate and the fixed plate.

The runner plate 48 is provided with runners $48a_1$ and $48a_2$ extending in a direction parallel to the cavity 44a of the mold member 44, and sprues $48b_1$ and $48b_2$ parallel to said joined surface $X_1-X_1$ and connected to the runners $48a_1$ and $48a_2$.

The sprues 46a and 46b of the fixed plate 46 are provided with runners 46c and 46d parallel to said joined surface $X_1-X_1$ and connected to the sprues 46a and 46b, and a runner 46e extending in a direction perpendicular to said joined surface $X_1-X_1$ is provided at the outlet side of the runners 46c and 46d.

This runner 46e is connected to the parallel runners $48b_1$ and $48b_2$ of the runner plate 48. Designated by 48c is a runner lock.

FIGS. 9a and 9b are a plan view and a perspective view, respectively, of the sprues and runners for the resin flowing through the runners $48a_1$, $48a_2$, ..., $48b_1$, $48b_2$, ..., the runner lock 48c, the sprues 46a, 46b and the runners 48c, 46d, 46e in the runner plate and fixed plate of the molding apparatus shown in FIG. 8.

FIG. 9c shows a cross-sectional view of the sprue and runner portion of the fixed plate. The outlet side of the runner 46c parallel to said joined surface $X_1-X_1$ has a vertically rising runner 46f which is connected to said vertical runner 46e.

In FIG. 9c, letter a indicates the height of a wall surface opposed to the outlet of the runner 46d, and letter b indicates the diameter of the runner 46d.

The resin A flowing through the runner 46c has its direction of flow changed by the runner 46f and changed into a vertical direction by the vertical runner 45e, but the resin passing through the runner 46f into the vertical runner 46e becomes difficult to flow toward the runner 46d due to the dimensional condition $a \geq b$.

The resin flowing through the runner 46d also becomes difficult to flow toward the runner 46f due to the dimensional condition $a \geq b$.

FIGS. 10 to 16 illustrate the operation of the present embodiment. FIGS. 10a and 10b show a state in which resin is not yet injected into the fixed plate 46, the runner plate 48 and the mold member 44, and these members are fixed by a mold tightening device, not shown, and each runner is connected to each sprue and the cavity of the mold member. The injection ports 41a and 42a of the first and second injection cylinder units 41 and 42 are closed by needle valves 41b and 42b, respectively. In the uninjected state of FIG. 10a, the resin has not come into the runner of FIG. 10b.

When in the skin layer resin pouring step, the needle valve 41b in the first injection cylinder unit 41 is opened as shown in FIG. 11a, the skin layer resin material A in the first injection cylinder unit is injected into the molding cavity 44a through sprues 46a, 46b and runners 46c, 46d provided in the fixed plate and the runners $48a_1$—48c of the runner plate. The skin layer resin material A leaves the injection ports 41a and 42a and enters the conical sprues 46a and 46b, and then enters the horizontal runner 46c. The resin A having thus entered the horizontal runner 46c, as shown in FIG. 9c, has its direction of flow bent at the outlet side of the runner 46c by the vertical runner 46f, and further bent in a direction perpendicular to the horizontal sprues $48a_1$—$48a_6$ of the runner plate 48 by the vertical runner 46e. The skin layer resin A passes from the runner 46c through the vertical runner 46e and through the runners $48b_1$—$48b_6$ and $48a_1$—$48a_6$ and is injected into the cavity 44a, and the resin supplied from the injection cylinder unit 41, when fed to the runners $48b_1$—$48b_6$ of the runner plate through the horizontal runner 46c, can impart substantially uniform resin pressure to all runners $48b_1$—$48b_6$ by the vertical runner 46e being provided. As a result, as shown in FIG. 11b, equal amounts of resin A are uniformly injected to the conical vertical runners $48a_1$—$48a_6$ of the runner plate 48 by substantially equal pressures.

When a predetermined amount of skin layer resin material A has been completely injected into the molding cavity, the needle valve 41b of the first injection cylinder unit 41 is closed and the needle valve 42b of the second injection cylinder unit 42 is opened to pour the core layer resin B into the cavity.

During the injection step of this core layer resin B, the needle valve 42b of the second injection cylinder unit 42 is opened and the core layer resin B is injected from the injection port into the sprue 46b of the fixed plate 46. The sprue 46b and the runner 46d are filled with the resin A injected during the previous step, but this resin is still molten and therefore, the resin B enters the cavity 44a of the mold member 44 through the sprues 46b, 46d and the runners $48b_1$ —$48b_6$ and $48a_1$ —$48a_6$ while pressing the resin A. The core layer resin B having thus entered the cavity 44a comes into the skin layer resin A poured into the cavity during the previous step while pressing the skin layer resin A against the peripheral wall surface of the cavity 44a.

The core layer resin B injected from the injection port 42a is poured into the runners $48b_1$ —$48b_6$ of the runner plate 48 through the sprue 46b and the horizontal runner 46d, but the core layer resin B passing through the runner 46d, when it enters the vertical runner 46e provided at the outlet side of the runner 46d, strikes against the surface opposed to the outlet of the runner 46d which forms the vertical runner 46e, whereby this resin has its direction of flow forcibly changed toward the outlet of the vertical runner 46e.

By being directed in the vertical direction by the vertical runner 46e, the core layer resin B is poured into the cavity while being uniformly separated into the runners $48b_1$ —$48b_6$ of the runner plate 48.

When a predetermined amount of core layer resin B has been poured into the cavity and held at a predetermined pressure for a predetermined time, the needle valve 42b of the second injection cylinder unit 42 is closed and the resin is cooled for a suitable time (FIGS. 13A and 13B).

When the steps of FIGS. 10 to 13 are terminated, the step of removing the molded article from the mold is entered.

This step of removing the molded article, as shown in FIG. 14, is accomplished by separating the mold member 44 from the joined surface $X_1$ —$X_1$ shown in FIG. 8, and pushing out the molded artice in the cavity by pushing-out means, not shown.

Subsequently, the joined surface $Y_1$ —$Y_1$ is separated and the core layer resin B in the runners and sprues is removed (FIG. 15).

Thus, the series of steps from the pouring of the skin layer resin A to the removal of the molded article are terminated.

FIG. 16 shows a cross-sectional view of a lens barrel member molded by the molding apparatus of FIGS. 8 to 15. The surface of the lens barrel is formed of the skin layer resin material, and the inside of the lens barrel is formed of the core layer resin material, the core layer resin material being surrounded by the skin layer resin material and being of sandwichlike cross-sectional shape.

The present embodiment ensures the sandwich molding of the helicoid portion and functional portion of the lens barrel member 22 go be well accomplished by making the volume of the helicoid portion and the volume of the functional portion substantially equal to each other.

The volume of the helicoid portion, as shown in FIGS. 6 and 7, refers to the product $l_1 \times t_1 \times W_1$, where length $l_1$ is the distance from the end $22b_1$ of the summit or valley of the helicoid 22b in the direction parallel to the optic axis to the key way of the cylinder portion 22a, $t_1$ is the cylinder thickness dimension of the $W_1$ is the width helicoid portion and the dimension of the divided portion obtained by dividing the helicoid. The volume of the functional portion refers to the product $l_2 \times t_2 \times W_2$, where $l_2$ is the length of the projected portion 22E, $t_2$ is the thickness dimension of the projected portion 22E and $W_2$ is the width dimension of the projected portion 22E.

By making the volume $l_2 \times t_1 \times W_1$ of the helicoid portion and the volume $l_2 \times t_2 \times w_2$ of the functional portion equal to each other, (that is, making the cavities of the portions of the cavity of the mold member of the aforementioned metal mold which correspond to the helicoid portion and the functional portion, respectively, equal to each other,) when the skin layer and resin material are poured in from the gate indicated by dotted line in FIG. 6, the skin layer resin material first poured in from the gate is poured separately into the cavity of the volume of the helicoid portion and the cavity of the volume of the functional portion via the cavity of the wall portion 22d.

Assuming that during the pouring-in of the resin, the temperature of the peripheral wall of the cavity of the metal mold is set to $80 \pm 10°$ C. and the temperature of the resin is $300 \pm 10°$ C., the skin layer resin material which is in contact with the metal mold loses its fluidity due to the difference between the temperature of the skin layer resin material and the temperature of the metal mold. After a predetermined amount of skin layer resin material has been poured in, the core layer resin material is poured into the skin layer resin material, and the core layer resin material poured into the skin layer resin material travels forwardly of the cavity in such a manner as to widen the skin layer resin against the peripheral wall of the cavity. The skin layer resin material widened against the peripheral wall of the cavity by the core layer resin material suddenly loses its fluidity due to the aforementioned temperature difference and the skin layer resin material comes to form the surfaces of the helicoid portion and the functional portion.

When the volume $l_1 \times t_1 \times W_1$ of the helicoid portion and the volume $l_2 \times t_2 \times W_2$ of the functional portion are made substantially equal to each other, the skin layer resin material poured in from the gate goes into the cavities of respective volumes by equal amounts and therefore, as shown in FIG. 16, equal amounts of skin layer are formed on the surfaces of the helicoid portion and the functional portion.

EFFECT OF EMBODIMENT 3

According to the present embodiment, the skin layer of the lens barrel member having threadably engaging portions such as helicoid, etc. and portions such as the key way threadably engaged and simply engaged with other lens barrel components can be uniformly molded and therefore, the strength and slidability of the helicoid portion and functional portion can be reliably ensured, and by incorporating the lens barrel member according to the present embodiment into a zoom lens barrel or a focusing lens barrel, the movability of the lens can be improved greatly.

Particularly, in the lens barrel member according to the present embodiment, the centers of the helicoid portion and the engaging portion are formed of the core layer resin and the surroundings of the core layer resin are formed into the shape of sandwich by the skin layer resin and the volumes of the helicoid portion and the engaging portion are made equal to each other, whereby sandwich molding in which the skin layer of the helicoid portion and the engaging portion is kept uniform, is accomplished to ensure the strength and slidability of these portions.

EMBODIMENT 4

Reference is now made to FIGS. 17 and 18 to describe an embodiment in which the gate through which the core layer resin material and the skin layer resin material are poured in is provided in the engaging portion of the key way.

In the present embodiment, the gate is provided at the rear end position 22g of the engaging portion 22e, as shown in FIG. 17. The skin layer resin material A poured in through the gate 22g is divided into the resin travelling toward the cylinder portion 22a and the resin travelling toward the wall portion 22d at the fore end 22e₁ of a plurality of engaging portions 22E provided on the circumference of the cylinder portion 22a, and the leading end of the skin layer resin depicts a wave form as indicated by $W_1$ in FIG. 18. When a predetermined amount of skin layer resin A has been poured into the cavity, the core layer resin B is poured from the second injection cylinder into the cavity through the same gate in such a manner as to force its way through the skin layer resin A.

The temperature of the peripheral wall of the metal mold around the cavity into which the injected resin is poured is 80±10° C., and in the case of polycarbonate, the temperature of the poured-in resin is 300±10° C. Therefore, the skin layer resin which has contacted the peripheral wall of the metal mold has its heat suddenly taken away and loses its fluidity, while the inside skin layer resin progresses along the peripheral wall as the core layer resin progresses through the cavity due to the injection pressure.

The leading end of the skin layer resin A provided by the continued pouring-in of the core layer resin progresses from $W_1$ to $W_2$ and further to $W_3$. The amount of skin layer resin A poured in is set to an amount which substantially uniformly fills the peripheral wall in said cavity, and the design is made such that the leading end of the skin layer resin material A in the cavity does not arrive the accessory mounting portion 22f as shown in FIG. 18 and the accessory mounting portion 22f is formed of the core layer resin B poured in after the skin layer resin A.

EFFECT OF EMBODIMENT 4

As described above, in the present embodiment, where a lens barrel member in which the accessory mounting portion 22f is provided at the fore end of the helicoid barrel and the engaging portions 22E are provided at the rear end of the helicoid barrel is molded with a plurality of resin materials layered in the shape of sandwich, a resin pouring-in gate is provided at the end of the engaging portions 22E, whereby the accessory mounting portion 22f can be filled with only the core layer resin material and thus, the strength of the accessory mounting portion can be ensured.

EMBODIMENT 5

The injection molding machine shown in the aforementioned patent publication and the injection molding machine proposed by the applicant are of such a construction in which first and second resin materials for forming the core and the surface layer in the same molding cavity of a mold are poured into the cavity through a valve communicating with the cavity of the mold and therefore, it is difficult to adjust the injection pressure of the resin. For example, the resin pressure from the first and second injection cylinders acts on the valve for changing over the pouring-in of the resin and therefore, the rotational movement of the valve is affected by the resin pressure applied to the valve.

To increase the frequency of injection within a unit time and enhance the productivity, it is desirable to start the injection cylinder pressure from a low level and then enhance it to the injection pressure during each injection step, and maintain the resin pressure at a high level for the next injection after the termination of the previous injection, and it is preferable to drop the injection pressure to a low level to smoothly effect rotation of the valve, but it is inefficient to carry out the step of reducing the injection pressure below a level which ensures smooth rotation of the valve. Also, if the operation of the valve is effected under high pressure to enhance the productivity, the life of the valve will become very short and also, there will arise a problem that the resin leaks from around the valve.

Reference is now made to FIG. 19 to 23 to describe an embodiment which solves the above-noted problems.

FIGS. 19 to 22 illustrate the various steps of process of the injection molding machine, and FIGS. 23(a)–23(e) show the state of the injection pressure of each injection cylinder and the opened and closed states of each passageway.

In these Figures, reference numeral 100 generally designates the molding machine. The molding machine 100 comprises a valve holding member 102 having a passageway 102A for a first resin material and a passageway 102B for a second resin material, first and second injection cylinder units 104 and 106, a mold 108 having a molding cavity 1008A therein, a sprue bush 110, etc.

The valve holding member 102 is formed with a hole 102C into which a valve 112 is fitted, and the hole 102C is connected to the passageways 102A and 102B.

Those sides of the valve holding member 102 which are adjacent to the entrances of the passageways 102A and 102B are connected to the inlet ports of the injection cylinder portions 104A and 106A of the injection cylinder units 104 and 106.

Reference numeral 114 designates a bush holding member for holding the sprue bush 110. The sprue bush 110 is provided with a sprue 110A which connects the molding cavity 108A of the mold 108 to the sprue 102D of the valve holding member 102.

The valve 112 fitted in the hole 102C of the valve holding member has a cylindrical shape and is provided with a cut-away portion 112A provided by cutting away the axially central portion thereof substantially semicircularly, and the cut-away end of the cut-away portion 112A is provided with cutting edges 112a₁ and 112a₂. The cross-section of the valve 112 shown in FIG. 19 shows the cross-section of the central portion of the cut-away portion 112A of the valve 112. The valve 112 is designed to be reciprocally rotated in x and y directions about the axis O by drive means such as an air pressure cylinder or a motor, not shown.

The state of the apparatus shown in FIG. 19 is a start state in which resin materials are not yet poured into the cavity from the injection cylinder units 104 and 106. In the present embodiment, the first resin material injected from the first injection cylinder unit 104 is polycarbonate, and the second resin material injected from the second injection cylinder unit 106 is a material composed of polycarbonate as a chief material and glass fiber of 30 % by weight as a submaterial.

From the start state of FIG. 19, the resin pressure of the first injection cylinder unit 104 is applied as preliminary pressure $P_{11}$ as indicated in the pressure graph of FIG. 23(a). When the pressure of the first resin material has reached the preliminary pressure, the valve 112 is rotated in the y1 direction and, as shown in FIG. 20, the cut-away portion 102C and the sprue 102D of the first passageway 102A and the valve 112 are opened. After the valve 112 has been opened, the pressure of the first resin material is elevated from the preliminary pressure $P_{11}$ to the injection pressure $P_{12}$ and injection is effected.

The pressure of the second resin material is elevated to a preliminary pressure $P_{21}$ before the injection of the first resin material is terminated, and a reduction in the pressure of the first resin material is started from the injection pressure $P_{12}$ after the injection of the first resin material has been terminated ($t_3$).

At a point in time at which the pressure of the first resin material has reached the preliminary pressure, the valve 112 is rotated in the x1 direction within the time from $t_4$ to $t_5$ and the first passageway 102A which is in the state shown in FIG. 21 is closed and the second passageway 102B is opened. When the second passageway 102B has been fully opened, the pressure of the second resin material is elevated to the injection pressure $P_{22}$, whereby the second resin material is injected.

Where a helicoid barrel incorporated in the lens barrel of an interchangeable lens for a single lens reflex camera was to be molded by the use of the injection molding machine of FIG. 19, when the opening-closing of the valve was effected with the preliminary pressure of the first resin material as the surface layer set to 50-100 kg/cm$^2$, the injection pressure $P_{12}$ set to about 1600 kg/cm$^2$, the preliminary pressure $P_{21}$ of the second resin material as the core material set to 50-100 kg/cm$^2$ and the injection pressure $P_{22}$ set to 1800 kg/cm$^2$, it was confirmed that the valve was moved smoothly.

It is confirmed that the operation of the valve 112 is affected by the sum of the resin pressures acting on the valve 112 through the first and second passageways 102A and 102B, and in FIG. 20, at the point in time $t_4$ at which the opening-closing of the passageways 102A and 102B is started, both the first resin material and the second resin material are maintained at their respective preliminary pressure levels, and the pressure of each resin material is adjusted in accordance with the pressure graphs of FIGS. 23(a) and 23(d) so that any excessively great resin pressure may not be loaded from one of the passageways to the valve 112. After the second resin material has been poured in until a predetermined lapse time $t_7$, the pressure of the second resin material is dropped to less than the preliminary pressure $P_{21}$, preferably, to the no-pressure state.

The injection step for the molding in the cavity of the metal mold is terminated in FIGS. 19 to 21, but if the operation of the molding machine is stopped in the state of FIG. 21, the second resin material for the core layer will remain in the cutaway portion 102C of the valve during the next cycle of molding, and this is not preferable. Therefore, after the step of FIG. 21, the valve 112 is further rotated and, as shown in FIG. 22, the first passageway 102A is opened to inject the first resin material.

EFFECT OF EMBODIMENT 5

As described above, in the injection molding machine of a construction in which the resin pressures from two passageways act on the valve in accordance with the present embodiment, where after the pouring-in of the first resin material has been terminated, the valve is rotated to change over the passageway and inject the second resin material, the second resin material is pressurized to the preliminary pressure during the first resin material injection step and the pressure of the first resin material is reduced to the preliminary pressure after the termination of the injection of the first resin material and before the rotation of the valve for the changeover of the passageway, whereby the pressure load of the valve can be decreased and thus, smooth rotation of the valve can be ensured.

Further, according to the present embodiment, the life of the valve can be greatly extended by the reduction in the pressure load to the valve. Particularly, the effect of the present embodiment resides in that a long life of the valve can be obtained with the mechanical accuracy thereof being maintained, and the leakage of resin by the abrasion or deformation of the valve can be prevented, and the accuracy of the valve itself can be ensured and also the cleaning of the molding machine necessitated by the leakage of resin can be greatly omitted and thus, the cycle of injection step can be shortened.

We claim:

1. A lens barrel having a sandwich-molded structure in which a central portion of a core layer of resin material is surrounded by a skin layer of resin material, wherein, said lens barrel comprises:
   (a) a cylinder portion;
   (b) a helicoid portion which is substantially equally divided on the inner or outer periphery of said cylinder portion;
   (c) a projected portion provided at one end of the outer periphery of said cylinder portion;
   (d) a keyway portion provided at said projected portion; and
   (e) a wall portion connected to said cylinder portion and in which said skin layer resin and core layer resin flow;
   wherein said wall portion is adapted to permit said skin layer resin and said core layer resin forming said lens barrel to be injected therethrough, wherein each resin is divided in substantially equal amounts at a connecting point of said wall portion and said cylinder portion and extends into said helicoid portion and said projected portion, and wherein said helicoid portion and said keyway portion are molded and have a sandwich structure in which the peripheral surface thereof is made of said skin layer resin and the core portion thereof is made of said core layer resin.

2. A lens barrel according to claim 1, wherein a first volume $l_1 \times t_1 \times W_1$ and a second volume $l_2 \times t_2 \times W_2$ are substantially equal where
   $l_1$ is the length from the end of the summit or valley of said helicoid portion in a direction parallel to the optical axis to the projected portion of said cylinder portion,
   $t_1$ is the thickness of said cylinder portion,
   $W_1$ is the width of the divided portion of said helicoid portion,
   $l_2$ is the length of said projected portion,
   $t_2$ is the thickness of said projected portion, and
   $W_2$ is the width of said projected portion.

3. A lens barrel having a sandwich-molded structure in which a central portion of a core layer of resin material is surrounded by a skin layer of resin material, wherein said lens barrel comprises:
(a) a cylinder portion;
(b) a helicoid portion which is substantially equally divided on the inner or the outer periphery of said cylinder portion;
(c) a projected portion provided at one end of the outer periphery of said cylinder portion;
(d) a keyway portion provided at said projected portion;
(e) an accessory mounting portion provide at another end of said cylinder portion in a direction parallel with the optical axis from said keyway portion; and
(f) a wall portion connected to said cylinder portion and in which said skin layer resin and core layer resin flow;
wherein said wall portion is adapted to permit said skin layer resin and said core layer resin forming said lens barrel to be injected therethrough, wherein each resin is divided in substantially equal amounts at a connecting point of said wall portion and said cylinder portion, and wherein said accessory mounting portion is molded only from said core layer resin.

4. A lens barrel according to claim 3, further comprising a gate for pouring said core layer resin and said skin layer resin and provided at the end of said projected portion.

5. A lens barrel having a sandwich-molded structure in which a central portion of a core layer of resin material is surrounded by a skin layer of resin material, wherein said lens barrel comprises a helicoid cylinder comprising:
a holding cylinder portion for holding a photo-taking lens;
a helicoid cylinder portion provided with a helicoid on the outer periphery thereof; and
an accessory mounting portion located at the fore end of said helicoid cylinder portion and being formed of only the core layer resin material.

6. A lens barrel having a sandwich-molded structure in which a central portion of a core layer of resin material is surrounded by a skin layer of resin material, wherein, said lens barrel comprises:
(a) a cylinder portion;
(b) a helicoid portion which is substantially equally divided on the inner or outer periphery of said cylinder portion;
(c) a projected portion provided at one end of the outer periphery of said cylinder portion in a direction parallel with the optical axis of said helicoid portion;
(d) a keyway portion provided at said projected portion;
(e) a wall portion connected to said cylinder portion and in which said skin layer resin and core layer resin flow; and
(f) an accessory mounting portion provided at another end of said cylinder portion, wherein
a first volume $l_1 \times t_1 \times W_1$ and a second volume $l_2 \times t_2 \times W_2$ are substantially equal, where $l_1$ is the length from the end of the summit or valley of said helicoid portion in a direction parallel to the optical axis to the projected portion of said cylinder portion,
$t_1$ is the thickness of said cylinder portion,
$W_1$ is the width of the divided portion of said helicoid portion,
$l_2$ is the length of said projected portion,
$t_2$ is the thickness of said projected portion, and
$W_2$ is the width of said projected portion,
wherein said wall portion is adapted to permit said skin layer resin and said core layer resin forming said lens barrel to be injected therethrough, wherein each resin is divided in substantially equal amounts at a connecting point of said wall portion and said cylinder portion and extend into said helicoid portion and said projected portion, and wherein said helicoid portion and said keyway portion are molded and have a sandwich structure in which the peripheral surface thereof is made of said skin layer resin and the core portion is made of said core layer resin.

7. A lens barrel having a sandwich-molded structure in which a central portion of a core layer of resin material is surrounded by a skin layer of resin material, wherein said lens barrel comprises:
(a) a cylinder portion;
(b) a helicoid portion which is substantially equally divided on the inner or outer periphery of said cylinder portion;
(c) a projected portion provided at one end of the outer periphery of said cylinder portion;
(d) a keyway portion provided at said projected portion;
(e) an accessory mounting portion provided at another end of said cylinder portion in the direction parallel with the optical axis from said keyway portion,
(f) a wall portion connected to said cylinder portion and in which said skin layer resin and said core layer resin flow;
wherein a first volume $l_1 \times t_1 \times W_1$ and a second volume $l_2 \times t_2 \times W_2$ are substantially, equal where
$l_1$ is the length from the end of the summit or valley of said helicoid portion in a direction parallel to the optical axis to the projected portion of said cylinder portion,
$t_1$ is the thickness of said cylinder portion,
$W_1$ is the width of the divided portion of said helicoid portion,
$l_2$ is the length of said projected portion,
$t_2$ is the thickness of said projected portion, and
$W_2$ is the width of said projected portion,
wherein said wall portion is adapted to permit said skin layer resin and said core layer resin forming said lens barrel to be injected therethrough, wherein each resin is divided in substantially equal amounts at a connecting point of said wall portion and said cylinder portion, and wherein said accessory mounting portion is molded only from said core layer resin.

* * * * *

UNITED STATES PATENT AND TRADEMARK OFFICE
CERTIFICATE OF CORRECTION

PATENT NO. : 4,826,424
DATED : May 2, 1989
INVENTOR(S) : Takashi Arai, et al.

It is certified that error appears in the above-identified patent and that said Letters Patent is hereby corrected as shown below:

AT [56]:

"Vesugi et al." should read --Uesugi et al.--

COLUMN 3:

Line 23, "FIG. 14" should read --FIG. 15--.

Line 43, "FIG. 22" (first occurrence) should be deleted.

Line 45, "in" (first occurrence) shoudl read --a--.

COLUMN 8:

Line 41, Lines 41 and 42 should be deleted.

COLUMN 10:

Line 50, "plat" should read --plate--.

UNITED STATES PATENT AND TRADEMARK OFFICE
CERTIFICATE OF CORRECTION

PATENT NO. : 4,826,424

DATED : May 2, 1989

INVENTOR(S) : Takashi Arai, et al.

It is certified that error appears in the above-identified patent and that said Letters Patent is hereby corrected as shown below:

COLUMN 11:

Line 54, "go" should read --to--.

Line 63, "of the" should read --and,--.

COLUMN 12:

Line 65, "molding" should read --molding,--.

COLUMN 16:

Line 56, "equal" should read --equal,--.

COLUMN 17:

Line 11, "provide" should read --provided--.

COLUMN 18:

Line 38, "portion," should read --portion; and--.

UNITED STATES PATENT AND TRADEMARK OFFICE
CERTIFICATE OF CORRECTION

PATENT NO. : 4,826,424

DATED : May 2, 1989

INVENTOR(S) : Takashi Arai, et al

It is certified that error appears in the above-identified patent and that said Letters Patent is hereby corrected as shown below:

Line 43 "substantially, equal" should read
--substantially equal, --.

Signed and Sealed this

Thirtieth Day of January, 1990

Attest:

JEFFREY M. SAMUELS

*Attesting Officer*     *Acting Commissioner of Patents and Trademarks*